(12) United States Patent
Matov et al.

(10) Patent No.: US 12,048,606 B2
(45) Date of Patent: Jul. 30, 2024

(54) SYSTEMS FOR TREATMENT PLANNING WITH OVERCORRECTION

(71) Applicant: ALIGN TECHNOLOGY, INC., San Jose, CA (US)

(72) Inventors: Vadim Matov, San Jose, CA (US); Fuming Wu, Pleasanton, CA (US); Anton Terekhov, Moscow (RU); Tzishing Jesse Lim, Mountain View, CA (US); Jihua Cheng, San Jose, CA (US); John Morton, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 17/586,543

(22) Filed: Jan. 27, 2022

(65) Prior Publication Data

US 2022/0370172 A1 Nov. 24, 2022

Related U.S. Application Data

(63) Continuation of application No. 15/051,364, filed on Feb. 23, 2016, now Pat. No. 11,259,896.

(60) Provisional application No. 62/119,724, filed on Feb. 23, 2015, provisional application No. 62/119,759, filed on Feb. 23, 2015.

(51) Int. Cl.
*A61C 7/00* (2006.01)
*A61C 7/08* (2006.01)
*G06F 30/00* (2020.01)

(52) U.S. Cl.
CPC ................ *A61C 7/002* (2013.01); *A61C 7/08* (2013.01); *G06F 30/00* (2020.01)

(58) Field of Classification Search
CPC ............ A61C 7/002; A61C 7/08; G06F 17/50
See application file for complete search history.

(56) References Cited

U.S. PATENT DOCUMENTS

| | | |
|---|---|---|
| 5,820,368 A | 10/1998 | Wolk |
| 6,227,850 B1 | 5/2001 | Chishti et al. |
| 6,227,851 B1 | 5/2001 | Chishti et al. |
| 6,318,994 B1 | 11/2001 | Chishti et al. |
| 6,371,761 B1 | 4/2002 | Cheang et al. |
| 6,386,864 B1 | 5/2002 | Kuo |
| 6,386,878 B1 | 5/2002 | Pavlovskaia et al. |
| 6,406,292 B1 | 6/2002 | Chishti et al. |
| 6,409,504 B1 | 6/2002 | Jones et al. |
| 6,454,565 B2 | 9/2002 | Phan et al. |

(Continued)

*Primary Examiner* — Nicholas D Lucchesi
(74) *Attorney, Agent, or Firm* — FORTEM IP LLP

(57) ABSTRACT

Orthodontic systems and related methods are disclosed for designing and providing improved or more effective tooth moving systems for eliciting a desired tooth movement and/or repositioning teeth into a desired arrangement. Methods and orthodontic systems include the generation of an overcorrection in the tooth-receiving cavities of an appliance worn in the dentition. The overcorrection may provide an improved and more accurately applied force or moment applied to a tooth. The overcorrected force or moment can move a tooth closer to a desired position than if not overcorrected as sufficient force can still applied to the tooth as it gets closer to the desired position. The overcorrected force or moment may also better target the root of the tooth where the biological response to tooth movement occurs. The overcorrection may be calculated in various ways as described herein.

20 Claims, 7 Drawing Sheets

(56) References Cited

U.S. PATENT DOCUMENTS

| | | |
|---|---|---|
| 6,457,972 B1 | 10/2002 | Chishti et al. |
| 6,488,499 B1 | 12/2002 | Miller |
| 6,514,074 B1 | 2/2003 | Chishti et al. |
| 6,582,229 B1 | 6/2003 | Miller et al. |
| 6,602,070 B2 | 8/2003 | Miller et al. |
| 6,607,382 B1 | 8/2003 | Kuo et al. |
| 6,621,491 B1 | 9/2003 | Baumrind et al. |
| 6,688,886 B2 | 2/2004 | Hughes et al. |
| 6,726,478 B1 | 4/2004 | Isiderio et al. |
| 6,739,869 B1 | 5/2004 | Taub et al. |
| 6,767,208 B2 | 7/2004 | Kaza |
| 6,783,360 B2 | 8/2004 | Chishti |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 7,040,896 B2 | 5/2006 | Pavlovskaia et al. |
| 7,063,532 B1 | 6/2006 | Jones et al. |
| 7,074,038 B1 | 7/2006 | Miller |
| 7,074,039 B2 | 7/2006 | Kopelman et al. |
| 7,077,647 B2 | 7/2006 | Choi et al. |
| 7,104,792 B2 | 9/2006 | Taub et al. |
| 7,108,508 B2 | 9/2006 | Hedge et al. |
| 7,121,825 B2 | 10/2006 | Chishti et al. |
| 7,134,874 B2 | 11/2006 | Chishti et al. |
| 7,156,661 B2 | 1/2007 | Choi et al. |
| 7,160,107 B2 | 1/2007 | Kopelman et al. |
| 7,192,273 B2 | 3/2007 | McSurdy, Jr. |
| 7,241,142 B2 | 7/2007 | Abolfathi et al. |
| 7,293,988 B2 | 11/2007 | Wen |
| 7,309,230 B2 | 12/2007 | Wen |
| 7,320,592 B2 | 1/2008 | Chishti et al. |
| 7,347,688 B2 | 3/2008 | Kopelman et al. |
| 7,354,270 B2 | 4/2008 | Abolfathi et al. |
| 7,357,634 B2 | 4/2008 | Knopp |
| 7,374,421 B2 * | 5/2008 | Solomon .................. A61C 7/08 433/18 |
| 7,448,514 B2 | 11/2008 | Wen |
| 7,543,511 B2 | 6/2009 | Kimura et al. |
| 7,553,157 B2 | 6/2009 | Abolfathi et al. |
| 7,555,403 B2 | 6/2009 | Kopelman et al. |
| 7,600,999 B2 | 10/2009 | Knopp |
| 7,637,740 B2 | 12/2009 | Knopp |
| 7,658,610 B2 | 2/2010 | Knopp |
| 7,689,398 B2 | 3/2010 | Cheng et al. |
| 7,736,147 B2 | 6/2010 | Kaza et al. |
| 7,746,339 B2 | 6/2010 | Matov et al. |
| 7,766,658 B2 | 8/2010 | Tricca et al. |
| 7,771,195 B2 | 8/2010 | Knopp et al. |
| 7,844,356 B2 | 11/2010 | Matov et al. |
| 7,844,429 B2 | 11/2010 | Matov et al. |
| 7,854,609 B2 | 12/2010 | Chen et al. |
| 7,865,259 B2 | 1/2011 | Kuo et al. |
| 7,871,269 B2 | 1/2011 | Wu et al. |
| 7,878,801 B2 | 2/2011 | Abolfathi et al. |
| 7,878,804 B2 | 2/2011 | Korytov et al. |
| 7,878,805 B2 | 2/2011 | Moss et al. |
| 7,880,751 B2 | 2/2011 | Kuo et al. |
| 7,883,334 B2 | 2/2011 | Li et al. |
| 7,904,308 B2 | 3/2011 | Arnone et al. |
| 7,914,283 B2 | 3/2011 | Kuo |
| 7,942,672 B2 | 5/2011 | Kuo |
| 7,947,508 B2 | 5/2011 | Tricca et al. |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,126,726 B2 | 2/2012 | Matov et al. |
| 8,152,518 B2 | 4/2012 | Kuo |
| 8,172,569 B2 | 5/2012 | Matty et al. |
| 8,235,715 B2 | 8/2012 | Kuo |
| 8,260,591 B2 | 9/2012 | Kass et al. |
| 8,275,180 B2 | 9/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,401,826 B2 | 3/2013 | Cheng et al. |
| 8,439,672 B2 | 5/2013 | Matov et al. |
| 8,517,726 B2 | 8/2013 | Kakavand et al. |
| 8,562,337 B2 | 10/2013 | Kuo et al. |
| 8,562,338 B2 | 10/2013 | Kitching et al. |
| 8,591,225 B2 | 11/2013 | Wu et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,788,285 B2 | 7/2014 | Kuo |
| 8,843,381 B2 | 9/2014 | Kuo et al. |
| 8,874,452 B2 | 10/2014 | Kuo |
| 8,896,592 B2 | 11/2014 | Boltunov et al. |
| 8,899,976 B2 | 12/2014 | Chen et al. |
| 8,930,219 B2 | 1/2015 | Trosien et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,037,439 B2 | 5/2015 | Kuo et al. |
| 9,060,829 B2 | 6/2015 | Sterental et al. |
| 9,119,691 B2 | 9/2015 | Namiranian et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,241,774 B2 | 1/2016 | Li et al. |
| 9,326,831 B2 | 5/2016 | Cheang |
| 9,364,296 B2 | 6/2016 | Kuo |
| 9,414,897 B2 | 8/2016 | Wu et al. |
| 9,433,476 B2 | 9/2016 | Khardekar et al. |
| 9,492,245 B2 | 11/2016 | Sherwood et al. |
| 9,610,141 B2 | 4/2017 | Kopelman et al. |
| 9,642,678 B2 | 5/2017 | Kuo |
| 9,655,691 B2 * | 5/2017 | Li ........................... A61C 7/08 |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,248,883 B2 | 4/2019 | Borovinskih et al. |
| 10,299,894 B2 | 5/2019 | Tanugula et al. |
| 10,342,638 B2 | 7/2019 | Kitching et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,595,966 B2 | 3/2020 | Carrier, Jr. et al. |
| 10,613,515 B2 | 4/2020 | Cramer et al. |
| 10,617,489 B2 | 4/2020 | Grove et al. |
| 10,639,134 B2 | 5/2020 | Shanjani et al. |
| 10,722,328 B2 | 7/2020 | Velazquez et al. |
| 10,743,964 B2 | 8/2020 | Wu et al. |
| 10,758,322 B2 | 9/2020 | Pokotilov et al. |
| 10,758,323 B2 | 9/2020 | Kopelman |
| 10,779,718 B2 | 9/2020 | Meyer et al. |
| 10,781,274 B2 | 9/2020 | Liska et al. |
| 10,792,127 B2 | 10/2020 | Kopelman et al. |
| 10,813,720 B2 | 10/2020 | Grove et al. |
| 10,828,130 B2 | 11/2020 | Pokotilov et al. |

(56) References Cited

U.S. PATENT DOCUMENTS

| | | |
|---|---|---|
| 10,835,349 B2 | 11/2020 | Cramer et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,973,611 B2 | 4/2021 | Pokotilov et al. |
| 10,993,783 B2 | 5/2021 | Wu et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 | 6/2021 | Shi et al. |
| 11,026,766 B2 | 6/2021 | Chekh et al. |
| 11,026,768 B2 | 6/2021 | Moss et al. |
| 11,026,831 B2 | 6/2021 | Kuo |
| 11,033,359 B2 | 6/2021 | Velazquez et al. |
| 11,045,282 B2 | 6/2021 | Kopelman et al. |
| 11,045,283 B2 | 6/2021 | Riley et al. |
| 11,071,608 B2 | 7/2021 | Derakhshan et al. |
| 11,096,763 B2 | 8/2021 | Akopov et al. |
| 11,103,330 B2 | 8/2021 | Webber et al. |
| 11,116,605 B2 | 9/2021 | Nyukhtikov et al. |
| 11,123,156 B2 | 9/2021 | Cam et al. |
| 11,147,652 B2 | 10/2021 | Mason et al. |
| 11,151,753 B2 | 10/2021 | Gao et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 2002/0192617 A1 | 12/2002 | Phan et al. |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2004/0152036 A1 | 8/2004 | Abolfathi |
| 2004/0166462 A1 | 8/2004 | Phan et al. |
| 2004/0166463 A1 | 8/2004 | Wen et al. |
| 2004/0197728 A1 | 10/2004 | Abolfathi et al. |
| 2004/0259049 A1 | 12/2004 | Kopelman et al. |
| 2005/0014105 A1 | 1/2005 | Abolfathi et al. |
| 2005/0182654 A1 | 8/2005 | Abolfathi et al. |
| 2005/0186524 A1 | 8/2005 | Abolfathi et al. |
| 2005/0244768 A1 | 11/2005 | Taub et al. |
| 2005/0244791 A1 | 11/2005 | Davis et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0127836 A1 | 6/2006 | Wen |
| 2006/0127852 A1 | 6/2006 | Wen |
| 2006/0127854 A1 | 6/2006 | Wen |
| 2006/0199142 A1 | 9/2006 | Liu et al. |
| 2006/0234179 A1 | 10/2006 | Wen et al. |
| 2006/0275731 A1 | 12/2006 | Wen et al. |
| 2006/0275736 A1 | 12/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2008/0306724 A1 | 12/2008 | Kitching et al. |
| 2008/0311535 A1 | 12/2008 | Andreiko |
| 2009/0280450 A1 | 11/2009 | Kuo |
| 2010/0009308 A1 | 1/2010 | Wen et al. |
| 2010/0055635 A1 | 3/2010 | Kakavand |
| 2010/0068672 A1 | 3/2010 | Arjomand et al. |
| 2010/0068676 A1 | 3/2010 | Mason et al. |
| 2010/0092907 A1 | 4/2010 | Knopp |
| 2010/0129763 A1 | 5/2010 | Kuo |
| 2010/0167243 A1 | 7/2010 | Spiridonov et al. |
| 2011/0269092 A1 | 11/2011 | Kuo et al. |
| 2013/0204599 A1 | 8/2013 | Matov et al. |
| 2013/0230818 A1* | 9/2013 | Matov ............... A61C 7/146 433/3 |
| 2014/0067334 A1 | 3/2014 | Kuo |
| 2015/0265376 A1 | 9/2015 | Kopelman |
| 2015/0366638 A1 | 12/2015 | Kopelman et al. |
| 2016/0193014 A1 | 7/2016 | Morton et al. |
| 2016/0242871 A1 | 8/2016 | Morton et al. |
| 2016/0310235 A1 | 10/2016 | Derakhshan et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2017/0273760 A1 | 9/2017 | Morton et al. |
| 2018/0280118 A1 | 10/2018 | Cramer |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0029784 A1 | 1/2019 | Moalem et al. |
| 2019/0046297 A1 | 2/2019 | Kopelman et al. |
| 2019/0053876 A1 | 2/2019 | Sterental et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0192259 A1 | 6/2019 | Kopelman et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0328487 A1 | 10/2019 | Levin et al. |
| 2019/0328488 A1 | 10/2019 | Levin et al. |
| 2019/0333622 A1 | 10/2019 | Levin et al. |
| 2019/0343601 A1 | 11/2019 | Roschin et al. |
| 2019/0343606 A1 | 11/2019 | Wu et al. |
| 2020/0000552 A1 | 1/2020 | Mednikov et al. |
| 2020/0000553 A1 | 1/2020 | Makarenkova et al. |
| 2020/0000554 A1 | 1/2020 | Makarenkova et al. |
| 2020/0000555 A1 | 1/2020 | Yuryev et al. |
| 2020/0085546 A1 | 3/2020 | Li et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0107915 A1 | 4/2020 | Roschin et al. |
| 2020/0155274 A1 | 5/2020 | Pimenov et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214800 A1 | 7/2020 | Matov et al. |
| 2020/0214801 A1 | 7/2020 | Wang et al. |
| 2020/0297458 A1 | 9/2020 | Roschin et al. |
| 2020/0306011 A1 | 10/2020 | Chekhonin et al. |
| 2020/0306012 A1 | 10/2020 | Roschin et al. |
| 2020/0315744 A1 | 10/2020 | Cramer |
| 2020/0360109 A1 | 11/2020 | Gao et al. |
| 2020/0390523 A1 | 12/2020 | Sato et al. |
| 2021/0073998 A1 | 3/2021 | Brown et al. |
| 2021/0078357 A1 | 3/2021 | Venkatasanthanam et al. |
| 2021/0134436 A1 | 5/2021 | Meyer et al. |
| 2021/0147672 A1 | 5/2021 | Cole et al. |
| 2021/0174477 A1 | 6/2021 | Shi et al. |

* cited by examiner

SYSTEMS FOR TREATMENT PLANNING WITH OVERCORRECTION

CROSS-REFERENCE

This application is a continuation of U.S. application Ser. No. 15/051,364, filed Feb. 23, 2016, now U.S. Pat. No. 11,259,896, issued Mar. 1, 2022, which claims the benefit of U.S. Provisional Application No. 62/119,724, filed Feb. 23, 2015, and U.S. Provisional Application No. 62/119,759, filed Feb. 23, 2015, the disclosures of each of which are incorporated herein by reference in their entirety.

BACKGROUND

Prior methods and apparatus for aligning teeth can be less than ideal in at least some instances. While braces can be used to move teeth into alignment, braces can be cumbersome to wear and can require expertise to place on the subject. Also, complex movements can be difficult to achieve and orthodontic placement may less than ideally address the complex movements of several teeth in at least some instances.

Transparent shell appliances have been used to successfully move teeth. For example, a user can be provided with a series of transparent shell appliances. Each shell of the series of shells may correspond to a stage of the treatment. For example, a fourth shell in a series of ten shells may correspond to the fourth state of treatment. Although transparent shell appliances can be used to successfully reposition teeth, the transparent shell appliances can provide less than ideal results in at least some instances. For example, complex movements of teeth, such as to fill an extraction can be difficult to treat with transparent shell appliances. Also, in at least some instances, a wearer of a transparent shell appliance may not complete treatment, for example when teeth do not move sufficiently with the appliance and the user stops treatment. Additionally, in at least some instances, the course of treatment may need to be reevaluated as the treatment is implemented, which may necessitate the manufacture of a second series of transparent shell appliances, prolonging treatment time.

Prior methods and apparatus of aligning teeth with transparent shell appliances can rely on providing shells with cavities shaped to the tooth profile at a final intended position and orientation at a stage of the treatment. Work in relation to embodiments suggests cavities shaped to position a tooth at a final intended position and orientation at a stage of the treatment can provide less than ideal movement. Although attachments can be placed on teeth to facilitate movement of the teeth with polymeric shell appliances, the resulting movements can be less than ideal in at least some instances. For example, the force applied to the tooth can decrease as the tooth moves toward the target position. Also, the movement of a tooth may not be uniform, and the tooth may move more easily along some dimensions than others. For example, the movement of a tooth can occur along six degrees of freedom, and relative movement compared to a target movement can differ among the degrees of freedom of the tooth. Further, the movement of teeth can be coupled, such that movement of a first tooth can affect movement adjacent teeth.

Prior appliances to move teeth may provide teeth receiving cavities at locations corresponding to the locations of the teeth at the end of each stage of treatment. This approach can be less than ideal in at least some instances.

Although manufacturing appliances in accordance with target positions of the teeth at the end of each stage of treatment can be effective, work in relation to embodiments suggests that the amount of force applied to each tooth can be less than or greater than would be ideal, and the corresponding movement of the tooth can be less than ideal in at least some instances. There can be a discrepancy between the locations of the teeth receiving cavities of the polymeric shell appliance applied and current positions of the teeth. The force and moment may be created from the deformation of the polymeric shell appliance put on the teeth. When a tooth is moved close to its position in the next stage of the treatment course, the discrepancy between the polymeric shell appliance used and the tooth also can get smaller. Accordingly, the force applied by the polymeric shell appliance can be also reduced. When the force is small enough, there may be no tooth movement achieved until the next polymeric shell appliance with a new, larger discrepancy is used. Additionally, the force and moment created by the polymeric shell appliance can be from the discrepancy of the crown part of the tooth, and may be applied on tooth crown only, for example. However, the biological response for tooth movement can be generally centered on the tooth root and not the crown. Therefore, the force from the crown discrepancy may be less than ideal for root movement.

In light of the above, it would be desirable to provide improved methods and apparatus for moving teeth to target positions with polymeric shell appliances. Ideally such methods and apparatus would more accurately move teeth to target positions with decreased forces.

SUMMARY

Described herein are embodiments of systems and methods to generate modified, overcorrected positions for a set of appliances such as polymeric shell appliances. An "achievement matrix" may be generated by data analysis of past treated cases to generate the modified, overcorrected positions. Alternatively or in combination, a "force moment matrix" may be generated by measuring the force and moment from the discrepancy of a particular polymeric shell appliance from the teeth of a subject. Alternatively or in combination, a rotational component may be added to the pure translation movement of a particular polymeric shell appliance to compensate for the tipping effect while moving teeth.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
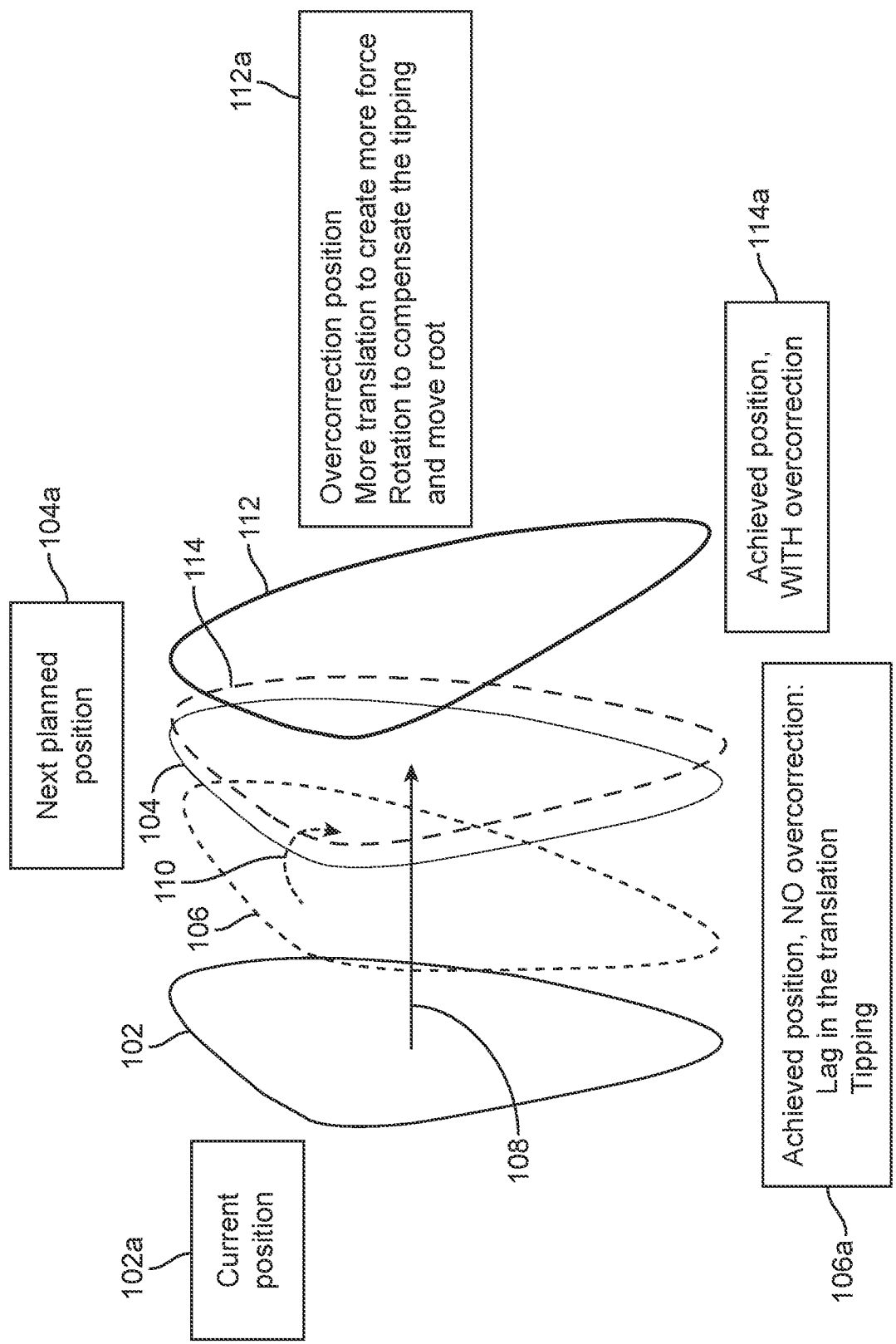
FIG. 1 shows a schematic of a tooth in a current position, a desired target position, an actual resulting position from the application of a plain polymeric shell appliance, an overcorrected position, and an actual resulting position from the application of a polymeric shell appliance of the present disclosure, according to many embodiments.

The present disclosure provides systems and methods to generate modified, overcorrected positions for a set of appliances such as polymeric shell appliances.

In one aspect, a system for moving one or more teeth with a dental appliance is provided. The system comprises a database comprising data corresponding to one or more of: (1) a plurality of discrepancies between target positions of teeth and achieved positions of the teeth in response to treatment, (2) a plurality of correlations between teeth movements and force systems applied by dental appliances, or (3) a plurality of clinical results of achieved teeth movements in response to force systems applied by dental appliances. The system can comprise a processing unit coupled to the database, wherein the processing unit is configured to determine an initial position of each of the one or more teeth, determine a target position for each of the one or more teeth in a treatment plan, and determine a movement vector to move said each of the one or more teeth from the initial position to the target position with an overcorrected tooth receiving cavity position determined in response to the data in the database.

In many embodiments, the database comprises one or more of patient treatment histories, orthodontic therapies, orthodontic information, or diagnostics.

In many embodiments, the data corresponds to the plurality of discrepancies, the plurality of discrepancies comprising a discrepancy of one or more of a force system, an achievement matrix, or clinical knowledge.

In many embodiments, the processing unit is configured to modify one or more tooth receiving cavity geometries of the dental appliance based on the overcorrected position.

In many embodiments, the movement vector is configured to establish a force system applied by the dental appliance to each tooth to move the tooth from the initial position to the target position with the overcorrected tooth receiving cavity position. The force system, when applied by the dental appliance, can move the tooth from the initial position to a position closer to the target position than the overcorrected tooth receiving cavity position. The force system can comprise one or more of a force, a moment of a force, or a moment of a couple.

In many embodiments, the movement vector is further determined in response to one or more of a minimum or maximum vertex distance.

In many embodiments, the processing unit is further configured to determine an overcorrected tooth receiving cavity corresponding to the overcorrected tooth receiving cavity position, the overcorrected tooth receiving cavity comprising a three dimensional shape profile to receive a corresponding tooth having a corresponding three dimensional shape profile, the three dimensional shape profile of the tooth receiving cavity being one or more of rotated or translated relative to the corresponding three dimensional shape profile of the corresponding tooth in the target position in order to define the overcorrected tooth receiving cavity position.

In many embodiments, the dental appliance comprises a polymeric shell appliance.

In many embodiments, the processing unit is further configured to generate instructions for fabricating a dental appliance in accordance with any of the embodiments herein, wherein the dental appliance comprises a tooth receiving cavity having the overcorrected tooth receiving cavity position. The dental appliance, when positioned on the one or more teeth, can be shaped to move the one or more teeth from the initial position toward the target position along the movement vector.

In another aspect, a method for determining one or more tooth receiving cavity positions of a dental appliance for moving one or more teeth is provided. The method can comprise: providing a database comprising data corresponding to one or more of: (1) a plurality of discrepancies between target positions of teeth and achieved positions of teeth in response to treatments, (2) a plurality of correlations between teeth movements and force systems applied by dental appliances, or (3) a plurality of clinical results of achieved teeth movements in response to force systems applied by dental appliances; determining an initial position of the one or more teeth; determining a target position of each of the one or more teeth in a treatment plan; and determining an overcorrected position of one or more tooth receiving cavities of the dental appliance in response to the data in the database.

In many embodiments, the database comprises one or more of patient treatment histories, orthodontic therapies, orthodontic information, or diagnostics.

In many embodiments, the data corresponds to the plurality of discrepancies, the plurality of discrepancies comprising a discrepancy of one or more of a force system, an achievement matrix, or clinical knowledge.

In many embodiments, the method further comprises modifying a geometry of the one or more tooth receiving cavities of the dental appliance based on the overcorrected position.

In many embodiments, the dental appliance is configured to apply a force system to the tooth to move the tooth from the initial position to the target position with the overcorrected tooth receiving cavity position. The force system, when applied by the dental appliance, can move the tooth from the initial position to a position closer to the target position than the overcorrected position. The force system can comprise one or more of a force, a moment of a force, or a moment of a couple.

In many embodiments, determining the overcorrected position comprises limiting the overcorrected position in response to one or more of a minimum or maximum vertex distance.

In many embodiments, the method further comprises determining an overcorrected tooth receiving cavity corresponding to the overcorrected tooth receiving cavity position, the overcorrected tooth receiving cavity comprising a three dimensional shape profile to receive a corresponding tooth having a corresponding three dimensional shape profile, the three dimensional shape profile of the tooth receiving cavity being one or more of rotated or translated relative to the corresponding three dimensional shape profile of the corresponding tooth in the target position in order to define the overcorrected position.

In many embodiments, the dental appliance comprises a polymeric shell appliance.

In many embodiments, the method further comprises generating instructions for fabricating a dental appliance in accordance with any of the embodiments herein, wherein the dental appliance comprises a tooth receiving cavity having the overcorrected tooth receiving cavity position. The dental appliance, when positioned on the one or more teeth, can be shaped to move the one or more teeth from the initial position toward the target position along the movement vector. The method can further comprise fabricating the dental appliance.

In another aspect, a system for moving one or more teeth with a dental appliance is provided. The system can comprise a database comprising data corresponding to a plurality of discrepancies between target positions of teeth and achieved positions of the teeth in response to treatment, and a processing unit coupled to the database. The processing unit can be configured to determine one or more initial positions of the one or more teeth, determine a target position for each of the one or more teeth in a treatment plan, and determine a movement vector to move said each of the one or more teeth from the initial position to the target position with an overcorrected tooth receiving cavity position determined in response to the plurality of discrepancies.

In many embodiments, the database comprises one or more of patient treatment histories, orthodontic therapies, orthodontic information, or diagnostics.

In many embodiments, the plurality of discrepancies comprises a discrepancy of one or more of a force system, an achievement matrix, or clinical knowledge.

In many embodiments, the processing unit is configured to modify one or more tooth receiving cavity geometries of the dental appliance based on the overcorrected position.

In many embodiments, the movement vector is configured to establish a force system applied by the dental appliance to the tooth to move the tooth from the initial position to the target position with the overcorrected tooth receiving cavity position. The force system, when applied by the dental appliance, may move the tooth from the initial position to a position closer to the target position than the overcorrected tooth receiving cavity position. The force system can comprise one or more of a force, a moment of a force, or a moment of a couple.

In many embodiments, the movement vector is further determined in response to one or more of a minimum or maximum vertex distance.

In many embodiments, the processing unit is configured to receive as input initial positions of each of the one or more teeth and final positions of each of the one or more teeth, to determine a plurality of stages corresponding to a plurality of appliances to move the one or more teeth from the initial positions to the final positions, to determine the target position along a movement path of each of the one or more teeth for each stage and to determine the overcorrected position of each of the one or more teeth in response to the target position along the movement path for each stage.

In another aspect, a system for moving one or more teeth with a dental appliance is provided. The system can comprise a database comprising a plurality of correlations between teeth movements and force systems applied by dental appliances, and a processing unit coupled to the database. The processing unit can be configured to determine an initial position of the one or more teeth, determine a target position for each of the one or more teeth in a treatment plan, and determine a movement vector to move said each of the one or more teeth from the initial position to the target position with an overcorrected tooth receiving cavity position different from the target position in response to the plurality of correlations.

In many embodiments, the database comprises one or more of patient treatment histories, orthodontic therapies, orthodontic information, or diagnostics.

In many embodiments, the processing unit is configured to modify one or more tooth receiving cavity geometries of the dental appliance based on the overcorrected position.

In many embodiments, the movement vector is configured to establish a force system applied by the dental appliance to the tooth to move the tooth from the initial position to the overcorrected position. The force system, when applied by the dental appliance, may move the tooth from the initial position to a position closer to the target position than the overcorrected position. The force system can comprise one or more of a force, a moment of a force, or a moment of a couple.

In many embodiments, the movement vector is further determined in response to one or more of a minimum or maximum vertex distance.

In many embodiments, the processing unit is configured to receive as input initial positions of each of the one or more teeth and final positions of each of the one or more teeth, to determine a plurality of stages corresponding to a plurality of appliances to move the one or more teeth from the initial positions to the final positions, to determine the target position along a movement path of each of the one or more teeth for each stage and to determine the overcorrected position of each of the one or more teeth in response to the target position along the movement path for each stage.

In another aspect, a system for moving one or more teeth with a dental appliance is provided. The system can comprise a database comprising a plurality of clinical results of achieved teeth movements in response to force systems applied by dental appliances, and a processing unit coupled to the database. The processing unit can be configured to determine an initial position of the one or more teeth, determine a target position for each of the one or more teeth in a treatment plan, and determine a movement vector to move said each of the one or more teeth from the initial position to the target position with an overcorrected tooth receiving cavity position determined in response to the plurality of clinical results.

In many embodiments, the database comprises one or more of patient treatment histories, orthodontic therapies, orthodontic information, or diagnostics.

In many embodiments, the processing unit is configured to modify a tooth receiving cavity geometry of the dental appliance based on the overcorrected position.

In many embodiments, the movement vector is configured to establish a force system applied by the dental appliance to the tooth to move the tooth from the initial position to the overcorrected position. The force system, when applied by the dental appliance, may move the tooth from the initial position to a position closer to the target position than the overcorrected position. The force system can comprise one or more of a force, a moment of a force, or a moment of a couple.

In many embodiments, the movement vector is further determined in response to one or more of a minimum or a maximum vertex distance.

In many embodiments, the processing unit is configured to receive as input initial positions of each of the one or more teeth and final positions of each of the one or more teeth, to determine a plurality of stages corresponding to a plurality of appliances to move the one or more teeth from the initial positions to the final positions, to determine the target position along a movement path of each of the one or more teeth for each stage and to determine the overcorrected position of each of the one or more teeth in response to the target position along the movement path for each stage.

In another aspect, a method for determining one or more tooth receiving cavity positions of a dental appliance for moving one or more teeth is provided. The method can comprise: providing a database comprising prior treatment data corresponding to a plurality of discrepancies between target positions of teeth and achieved positions of teeth in response to treatments; determining an initial position of the one or more teeth; determining a target position of each of the one or more teeth in a treatment plan; and determining an overcorrected position of the one or more tooth receiving cavities in response the prior treatment data.

In many embodiments, the database comprises one or more of patient treatment histories, orthodontic therapies, orthodontic information, or diagnostics.

In many embodiments, the dental appliance is configured to apply a force system to the tooth to move the tooth from the initial position to the overcorrected position. The force system, when applied by the dental appliance, can move the tooth from the initial position to a position closer to the target position than the overcorrected position. The force system can comprise one or more of a force, a moment of a force, or a moment of a couple.

In many embodiments, determining the overcorrected position comprises limiting the overcorrected position in response to one or more of a minimum or maximum vertex distance.

In another aspect, a method for moving one or more teeth with a dental appliance is provided. The method can comprise providing a database comprising a plurality of correlations between teeth movements and force systems applied by dental appliances; and determining one or more overcorrected positions of one or more tooth receiving cavities of the dental appliance in response to the plurality of correlations.

In many embodiments, the database comprises one or more of patient treatment histories, orthodontic therapies, orthodontic information, or diagnostics.

In many embodiments, the dental appliance is configured to apply a force system to the tooth to move the tooth from the initial position to the overcorrected position. The force system, when applied by the dental appliance, can move the tooth from the initial position to a position closer to the target position than the overcorrected position. The force system can comprise one or more of a force, a moment of a force, or a moment of a couple.

In many embodiments, determining the overcorrected position comprises limiting the overcorrected position in response to one or more of a minimum or maximum vertex distance.

In another aspect, a method for determining positions of one or more tooth receiving cavities of a dental appliance for moving one or more teeth is provided. The method can comprise providing a database comprising a plurality of clinical results of achieved teeth movements in response to force systems applied by dental appliances; and determining an overcorrected position of the one or more tooth receiving cavities in response to the plurality of clinical results of achieved teeth movements in response to force systems applied by dental appliances.

In many embodiments, the database comprises one or more of patient treatment histories, orthodontic therapies, orthodontic information, or diagnostics.

In many embodiments, the dental appliance is configured to apply a force system to the tooth to move the tooth from the initial position to the overcorrected position. The force system, when applied by the dental appliance, can move the tooth from the initial position to a position closer to the target position than the overcorrected position. The force system can comprise one or more of a force, a moment of a force, and a moment of a couple.

In many embodiments, determining the overcorrected position comprises limiting the overcorrected position in response to one or more of a minimum or maximum vertex distance.

In another aspect, a method for moving teeth of a patient is provided. The method can comprise: providing a first appliance having a first plurality of overcorrected tooth-receiving cavities to move the teeth to first target positions, the first overcorrected tooth receiving cavities having positions different from the first target positions by first amounts; and providing a second appliance having a second plurality of overcorrected tooth-receiving cavities to move the teeth to second target positions, the second overcorrected tooth receiving cavities having positions different from the second target positions by second amounts; wherein the second amounts are less than the first amounts.

In many embodiments, the first amounts comprise a first plurality of first amounts and the second amounts comprise a second plurality of second amounts, each of the second plurality of second amounts less than a corresponding first amount of the first plurality of first amounts.

In many embodiments, the second overcorrections are provided after the first overcorrections. Alternatively, the second overcorrections can be provided before the first overcorrections.

In many embodiments, the method further comprises providing a third appliance having a third plurality of overcorrected tooth-receiving cavities to move the teeth to third target positions, the third overcorrected tooth receiving cavities having positions different from the third target positions by third amounts, wherein the third amounts are less than the first and second amounts. The third appliance can be provided before or after the second appliance.

In another aspect, a system for moving teeth of a patient is provided. The system can comprise: a first appliance having a first plurality of overcorrected tooth-receiving cavities to move the teeth to first target positions, the first overcorrected tooth receiving cavities having positions different from the first target positions by first amounts; and a second appliance having a second plurality of overcorrected tooth-receiving cavities to move the teeth to second target positions, the second overcorrected tooth receiving cavities having positions different from the second target positions by second amounts; wherein the second amounts are less than the first amounts.

In many embodiments, the first amounts comprise a first plurality of first amounts and the second amounts comprise a second plurality of second amounts, each of the second plurality of second amounts less than a corresponding first amount of the first plurality.

In many embodiments, the system further comprises a third appliance having a third plurality of overcorrected tooth-receiving cavities to move the teeth to third target positions, the third overcorrected tooth receiving cavities having positions different from the third target positions by third amounts, wherein the third amounts are less than the first and second amounts.

In another aspect, for a system or a method according to any of the embodiments herein, the one or more teeth comprise a plurality of teeth, and the appliance comprises a plurality of overcorrected teeth receiving cavities.

In another aspect, for a system or a method according to any of the embodiments herein, each overcorrected tooth receiving cavity comprises a three dimensional shape profile to receive a corresponding tooth having a corresponding three dimensional shape profile, the three dimensional shape profile of the tooth receiving cavity one or more of rotated or translated relative to the corresponding three dimensional shape profile of the corresponding tooth in the target position in order to define the overcorrected tooth receiving cavity position.

In another aspect, for a system or a method according to any of the embodiments herein, the overcorrected tooth receiving cavity comprises an over correction of a three-dimensional shape profile along one or more of six degrees of freedom of the tooth receiving cavity of said each of the one or more teeth.

In another aspect, for a system or a method according to any of the embodiments herein, the appliance comprises a polymeric shell appliance and the polymeric shell appliance has been directly manufactured with one or more of 3D printing, stereo lithography, or fused deposition modeling.

In another aspect, a method for moving one or more teeth is provided comprising providing a system according to any of the embodiments herein.

In another aspect, a system or a method according to any of the embodiments herein further comprises instructions for manufacturing the dental appliance.

The methods, systems, and apparatus disclosed herein can be combined in many ways and may comprise one or more components of known polymer shell appliances. Known shell appliances to reposition teeth may include features to facilitate the predictability of teeth movement. For example, such features may include "Active Attachment," "Activator," "Pressure Point," "Bite ramp," and "Power ridge" available in products of Align Technology, Inc. of Santa Clara, CA Such features may depend on adding features to the plain shell appliance and/or the teeth. For example, by active attachment with an activator or attachment, more torque can be created to rotate the canine or premolar. The power ridge may be used to create torque to move root in buccal-lingual direction. The polymer shell appliance inner surface may then be modified partially near the features attached or added to a tooth. However, the majority of the surface of the polymeric shell appliance may still be in the original position (i.e., the intended position of the teeth for the particular stage of treatment) and unchanged. The instant application refers to such a polymeric shell appliance as a "plain polymeric shell appliance."

As used herein, the terms "target position" and "planned position" are used interchangeably.

As used herein, the terms "patient" and "subject" are used interchangeably.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication as described herein, for example. Alternatively or in combination, the appliance can be fabricated with machining such as an appliance fabricated from a block of material with computer numeric control machining.

Examples of appliances such as polymeric shell appliances suitable for incorporation in accordance with embodiments of the present disclosure suitable are described in U.S. application Ser. No. 12/623,340, filed on Nov. 20, 2009, published as US 2010/0138025 on Jun. 3, 2010, entitled "Orthodontic systems and methods including parametric attachments", and U.S. application Ser. No. 13/865,091, filed on Apr. 17, 2013, published as US 2013/0230818, entitled "Method and system for optimizing dental aligner geometry", the entire disclosures of which are incorporated herein by reference.

In many instances and for many movements, a plain polymeric shell appliance may work well. Features can be added when there are difficult movements such as significant rotation, extrusion, or root movement. Even so, the plain polymeric shell appliance itself can still create the majority of force and moment to move the tooth.

A manufacturing process for a plain polymeric shell appliance may be as follows. First, initial and final teeth positions may be acquired, and a movement path may be generated of all the teeth. Then, additional features such as attachments, dimples, and ridges may be added to the teeth. A 3D printer may then be used to print the physical mold of the teeth, jaw, and other features. A thin plastic sheet may be thermal formed on the mold. The gingival line may be cut, and the polymeric shell appliance may be removed from the mold. Finally, the plain polymeric shell appliance may be cleaned and packaged.

In many embodiments, a processor comprises a user input and display for a user to position and orient a plurality of teeth at target positions and orientations for each stage of a treatment. Alternatively, the user may input position and orient the plurality of teeth at target final positions and orientations for the final stage of a treatment, and the processor may determine positions and orientations of the teeth at each of a plurality of intermediate stages of treatment. The processor may receive as input the plurality of initial positions and initial orientations of the teeth. The processor may comprise instructions to position teeth receiving cavities of the appliance at positions away from the target positions and orientations for each stage of a plurality of stages of the treatment in order to provide activation energy to the appliance. The processor may comprise instructions to output the positions of the teeth receiving cavities away from the target positions and orientations for each stage of the plurality of stages. The processor may comprise instructions to manufacture a plurality of appliances with indirect manufacturing comprising thermoforming or direct manufacturing comprising one or more of 3D printing, stereolithography, or fused deposition modeling, for example. In many embodiments, the processor generates instructions for fabricating one or more appliances and transmits the instructions to a fabrication machine, e.g., configured to fabricate the appliances using indirect manufacturing or direct manufacturing, or combinations thereof.

The plain polymeric shell appliance can be made from the tooth position from the initial and final positions. In software, for example, the tooth position can be designed with the following principles in mind. The teeth may not collide with each other in all stages, or else the course of treatment can include removal of parts of one or more teeth. Additionally, in some embodiments, teeth are not moved too fast because of biological limitations.

Accordingly, the tooth movement path generated for each stage of treatment can be related to the limit that the tooth can be moved for the particular stage of treatment. The polymeric shell appliance itself, however, can be used to move the tooth but not to limit tooth movement, for example. The force from a polymeric shell appliance can be created because the appliance can be based on the teeth positioning of the next stage of treatment and put on the full dentition of the patient in the current stage of treatment.

In this present disclosure, improved methods of creating polymeric shell appliances are provided. Instead of creating a polymeric shell appliance with teeth receiving cavities corresponding to the position of a tooth in the next stage of treatment, the appliance can be created based on a modified, overcorrected tooth position, for example. In this modified tooth position, force and moment may be created to move the tooth root in the desired direction, rather than limiting the tooth to next position. A schematic of a modified tooth position for targeting the tooth root is shown in FIG. 1.

FIG. 1 shows a schematic of a tooth in various positions—a current position 102 (e.g., current position 102a), a desired target position 104 comprising the planned location of the tooth at the end of the treatment stage (e.g., next planned position 104a), an actual resulting position 106 from the application of a plain polymeric shell appliance (e.g., an achieved position with no overcorrection 106a, which may exhibit lag in the translation and/or tipping relative to the next planned position 104a), an overcorrected position 112 (e.g., overcorrected position 112a, which may exhibit more translation to create more force and/or rotation to compensate for tipping and to move the root relative to the next planned position 104a), and an actual resulting position 114 from the application of a polymeric shell appliance of the present disclosure configured to overcorrect as described herein (e.g., achieved position with overcorrection 114a, which may be close to or substantially match the next planned position 104a). Because the force and moment generated can decrease as the appliance and tooth discrepancy decreases, there can be a discrepancy between the desired target position 104 and the actual position 106 that is achieved. There may be a lag in the translation of the tooth as indicated by the arrow 108. There may be tipping or rotation from the root as indicated by the arrow 110. According to embodiments of the present disclosure, a polymeric shell appliance may be configured with the tooth receiving cavities of the appliance at locations corresponding to an overcorrected position 112. More translation may be provided versus the uncorrected appliance to create more force. Rotation may be added to compensate for the tipping effect and move the root. The force and moment generated can decrease as the discrepancy between appliance and tooth decreases. A discrepancy can remain, however, between the overcorrected position 112 of the tooth receiving cavity and the actual position 114 that is achieved, as the tooth moves toward the target position. The resulting position 114 from the overcorrection can more closely match the desired target position 104 in the course of treatment.

The appliances such as polymeric shell appliances can be configured in one or more of many ways with the overcorrected tooth receiving cavities to move one or more teeth as described herein. The tooth comprises a tooth profile, such as a three-dimensional shape profile, and the tooth receiving cavity of the polymeric shell appliance may comprise a corresponding internal three dimensional shape profile to receive the tooth. The position of the shape profile of the tooth receiving cavity of the polymeric shell appliance can be overcorrected in relation to the next planned position of the tooth. Alternatively or in combination, the orientation of the three dimensional shape profile of the tooth receiving cavity can be overcorrected in relation to the next planned orientation of the tooth.

The overcorrection with the three-dimensional shape profile of the tooth receiving cavity can be provided along one or more of six degrees of freedom. The overcorrection can be provided along two or more degrees of freedom, for example along one translational and one rotational degree of freedom. The overcorrection can be provided along three or more degrees of freedom, for example along two translational and one rotational degree of freedom. The amount of overcorrection along each degree of freedom can be determined in response to clinical data, for example. Additional degrees of freedom of the tooth receiving cavities can be overcorrected to move the tooth to the planned position and orientation.

The appliance can be configured to move a plurality of teeth with a plurality of overcorrected tooth receiving cavities at each of a plurality of stages of the treatment as described herein. Each of the plurality of overcorrected tooth receiving cavities can be configured to move the corresponding tooth of the plurality of teeth to the planned target position.

Figure 2:
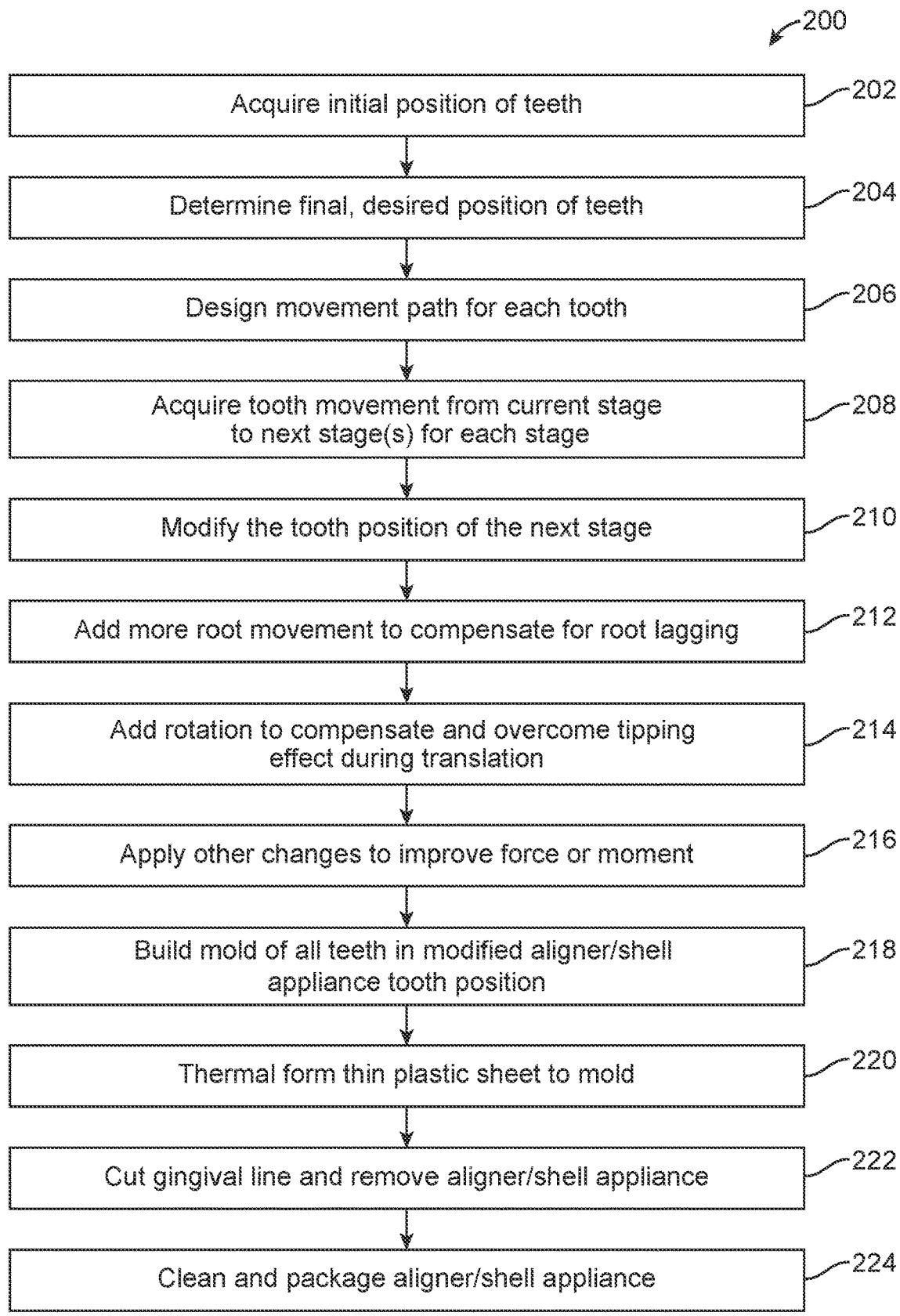
FIG. 2 shows a flowchart of a method of manufacturing a set of polymeric shell appliances with overcorrection, according to many embodiments.

Referring to FIG. 2, an exemplary method 200 of creating a polymeric shell appliance may be as follows. In a step 202, the initial position of the teeth of a subject may be acquired and input to a processor. In a step 204, the final, desired position of the teeth of the subject at the end of a course of treatment may be determined and input to a processor. In a step 206, the movement path for each tooth may be designed. The movement path may be designed such that, at each stage of treatment, the teeth may not collide with each other and may move at a limited speed (e.g., 0.25 mm/treatment stage, which may for example be 2 weeks). In a step 208, the tooth movement from the current stage to next stage or next several stages may be acquired. In a step 210, the tooth position of next stage may be modified so sufficient force is created (i.e., the discrepancy from the current to next stage is sufficiently large) to move the tooth closely to the desired target position. The modification of step 210 can be performed with an overcorrection in one or more of many ways. For example, the tooth position may be overcorrected as described herein. In a step 212, more root movement may be added to compensate for the tooth root lagging during the movement, for example with overcorrection of one or more of the position or orientation of the tooth receiving cavity. In a step 214, rotation may be added to compensate and overcome the tipping effect while tooth is in bodily translation (e.g., for space closure treatment), for example with overcorrection of one or more of the position or orientation of the tooth receiving cavity. In a step 216, other changes may be applied to improve the force or moment applied, for example with overcorrection of one or more of the position or orientation of the tooth receiving cavity. In a step 218, a mold of all teeth in the modified aligner (i.e., overcorrected polymeric shell appliance) tooth position and jaw may be created. Other features such as like attachment and power ridges may be added. The mold may be created using 3D printing technology, for example. In a step 220, a thin plastic sheet may be thermal formed to the mold to create the aligner or appliance. In a step 222, the gingival line may be cut from the molded sheet and the aligner or appliance may be removed from the mold. In a step 224, the aligner or appliance may be cleaned and packaged. Alternatively or in combination, the appliance can be fabricated directly, for example with one or more of 3D printing, stereo lithography, or fused deposition modeling of the appliance, for example.

Although the above steps show the method 200 of generating a set of polymeric shell appliances overcorrected to move teeth in an improved manner in accordance with many embodiments, a person of ordinary skill in the art will recognize many variations based on the teaching described herein. The steps may be completed in a different order. Steps may be added or deleted. Some of the steps may comprise sub-steps. Many of the steps may be repeated as often as beneficial to the treatment.

One or more of the steps of the method 200 may be performed with circuitry as described herein, for example one or more of a processor or logic circuitry of a computer or a computerized system. The circuitry may be programmed to provide one or more of the steps of the method 200, and the program may comprise program instructions stored on a computer readable memory or programmed steps of the logic circuitry, for example.

Aspects of the present disclosure provide several ways to modify the tooth position for the aligner or polymeric shell appliances, which are discussed herein and as follows. The methods of modifying the tooth position may be applied alone, in various combinations, or in various combinations of their component steps or parts.

1. Modify Tooth Position Based on Achievement Statistics

The appropriate overcorrection may be determined using achievement statistics. Achievement statistics describe the relationship between the achieved and planned tooth movement for post treatment (or in the middle treatment) cases. A tooth can be considered as a rigid body and its movement can be described by 6 degrees of freedom (DOFs), or 3 translation and 3 rotations. Optionally, the achievement statistics provide data corresponding to discrepancies between achieved and planned target positions of teeth in response to treatment.

After the treatment, the teeth are moved to a new position close to the planned final position, but not exactly the same. The movement from the initial tooth position to this new position may be called the achieved movement. The achieved movement can be measured by taking a new impression and comparing it to the initial impression. Alternatively or in combination, other types of data besides impressions can be used, such as scans or images of the teeth.

The relationship between the planned movement and the achieved movement can be described by a statistical relationship called a Planned-Achievement Relation.

The achievement statistics can show coupling among planned movements and achieved movements, and cross-coupling among terms can be used to design the polymeric shell appliance.

The Planned-Achievement Relation can be estimated by data analysis of a large number of treated cases. In some embodiments, linear regression may be used.

The Planned-Achievement Relation estimated from the after treatment cases can represent full movement, i.e., from an initial position of the teeth to the final position of the teeth. The Planned-Achievement Relation for a single stage (which may be referred to as a stage Planned-Achievement Relation) can be computed from the full Planned-Achievement Relation when the stage number is known. The overcorrection can be computed from the Planned-Achievement Relation. From the Planned-Achievement Relation, it can be known that the desired final positions of the teeth may not be fully achieved using a plain aligner or polymeric shell appliance. An overcorrection may be used to amplify and correct the movement.

However, the overcorrection movement can be adjusted more to deal with complicated tooth movement. A consideration may be to blend the overcorrection with planned movement. In some embodiments, when treatment is started, the overcorrection should not be too great because a greater than necessary overcorrection may apply too great a force to the root and cause the patient pain and/or discomfort. After several weeks, teeth may start moving and the bone near the root may get soft because of the biological response. Then, further overcorrection can be added. In some embodiments, when the treatment is reaching the final stage, the overcorrection can be reduced to let the tooth move closer to the final position, rather than having a larger overcorrection position.

The data from clinical studies can be fit, for example, with a linear regression of the coefficients of the achievement matrix and R2 values determined.

Figure 3:
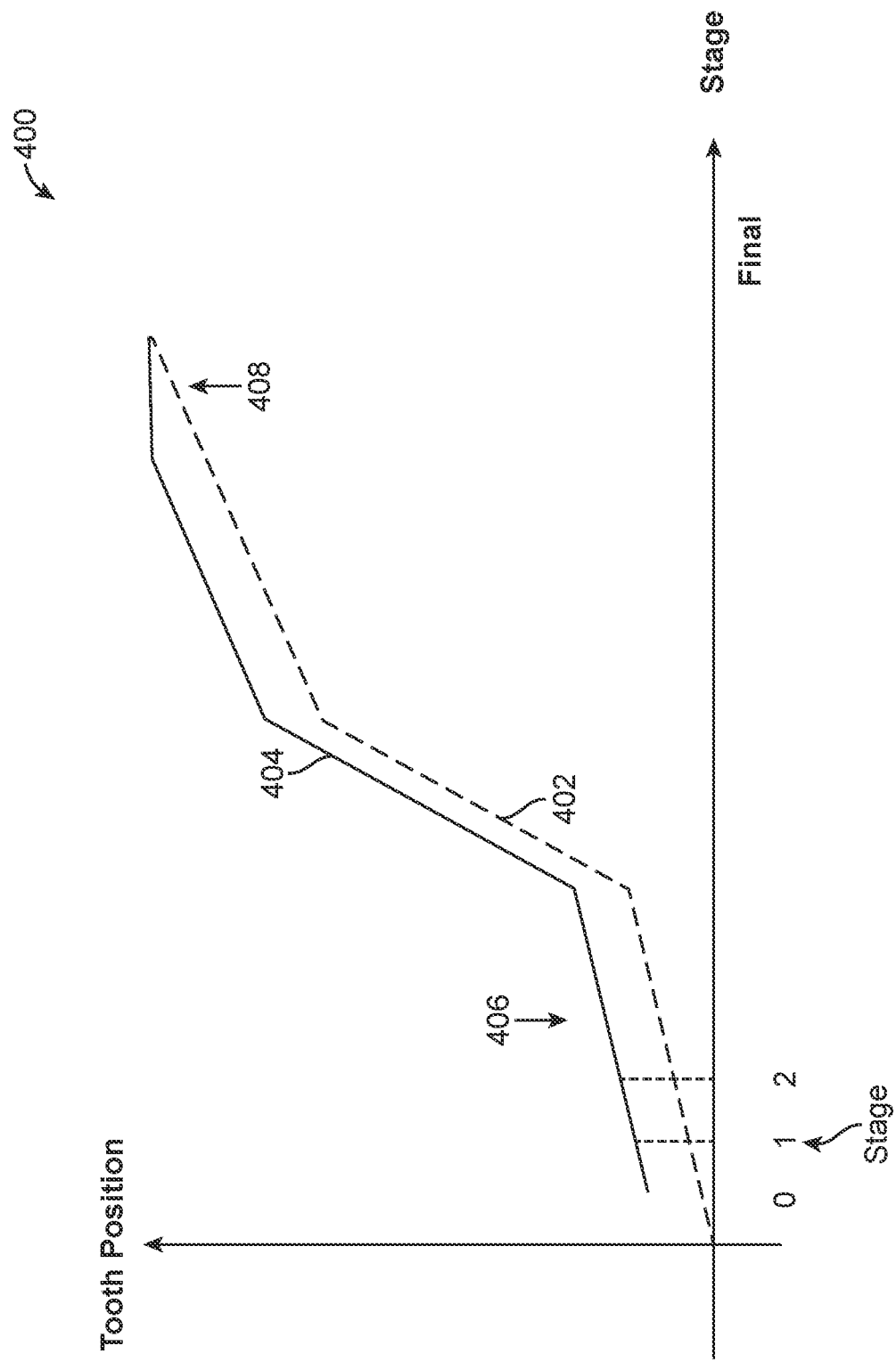
FIG. 3 shows a graph of the discrepancy between a planned tooth path and an overcorrected tooth path, according to many embodiments.

The change of overcorrection is shown in the overcorrection graph 400 of FIG. 3. The graph 400 shows the planned tooth path 402 of one or more teeth of the subject, and the overcorrected tooth receiving cavity path 404 for a plurality of stages of treatment, e.g., 0 (initial prior to treatment), 1, 2, etc. to N, where N is the final stage. The graph 400 includes a line for the planned tooth path 402, which can be compared to the overcorrected tooth path 404. There may be greater overcorrection at early stage 406 versus at the later stage 408. Each stage has a planned tooth position of the subject and a corresponding overcorrected tooth position of the tooth receiving cavity of the appliance as shown with the dashed line of stages 1 and 2, for example. Each of the plurality of teeth receiving cavities of an appliance for a stage can be overcorrected with reference to the tooth position as described herein. The tooth receiving cavities of the final stage may or may not be overcorrected, and the appliance may be left on the teeth for a longer amount of time to ensure that the teeth have moved to the final target positions.

The processing unit as described herein can be configured with instructions to receive as input initial positions of each of the one or more teeth and final positions of each of the one or more teeth. The processing unit can be configured with instructions to determine a plurality of stages corresponding to a plurality of appliances to move the one or more teeth from the initial positions to the final positions. The processing unit can be configured to determine the target position along a planned movement path of each of the one or more teeth for each stage and to determine the overcorrected position of each of the one or more tooth receiving cavities in response to the target position along the movement path for each stage, for example.

The overcorrection may be gradually reduced to none as the treatment course nears completion. Such reduction in the overcorrection may be provided to allow the soft tissue of the patient to begin to set, for example.

Improved methods and systems to move teeth by applying such gradually decreasing overcorrections are provided by the present disclosure. The positions of the tooth receiving cavities of the appliance can be located to provide overcorrection force vectors to the teeth. For example, if the target location of the tooth for the present stage is located 0.2 mm from the position of the immediately prior stage, the tooth receiving cavity can be located 0.3 mm from the position of the prior stage in order to provide overcorrection with the desired force vector, for example. A first overcorrected force vector may be applied on teeth to move the teeth to a first target position with a first overcorrected tooth receiving cavity of a first appliance. The first overcorrected force vector may have a first overcorrection directed to move the teeth to a first overcorrected position different from the first target position. A second overcorrected force vector may then be applied on the teeth to move the teeth to a second target position with a second overcorrected tooth receiving cavity of a second appliance. The second overcorrected force vector may have a second overcorrection directed to move the teeth to a second overcorrected position different from the second target position. The second overcorrection may be less than the first overcorrection and may be applied after the first overcorrection. A third overcorrected force vector may be applied on the teeth to move the teeth to a third target position with a third over corrected tooth receiving cavity of a third appliance. The third overcorrected force vector may have a third overcorrection directed to move the teeth to a third overcorrected position different from the third target position. The third overcorrection may be less than the first and second overcorrections. First, second, and/or third shell appliances having first, second, and/or third pluralities of tooth-receiving cavities, for example, may be provided and configured to apply the first, second, and/or third overcorrected force vectors on the tooth, for example. A person of ordinary skill in the art will recognize variations in one or more of the order, timing or amount of overcorrection.

Another adjustment may include the minimum and maximum crown movement. In some embodiments, to move the tooth, enough force but not too large of a force should be applied to the tooth. For an aligner or polymeric shell appliance, the force created can be related to the discrepancy between the aligner or appliance to the tooth. The overcorrection movement can be modified as follows and as described herein.

The maximum movement distance for all crown surface points, from the current position to the overcorrection position, can be measured. This maximum vertex distance can be bigger than one number, for example, 0.2 mm. This distance can be less than another number, for example 0.50 mm. If the distance is too big or small, the overcorrection movement can be increased or reduced by multiplying the movement vector.

Figure 4:
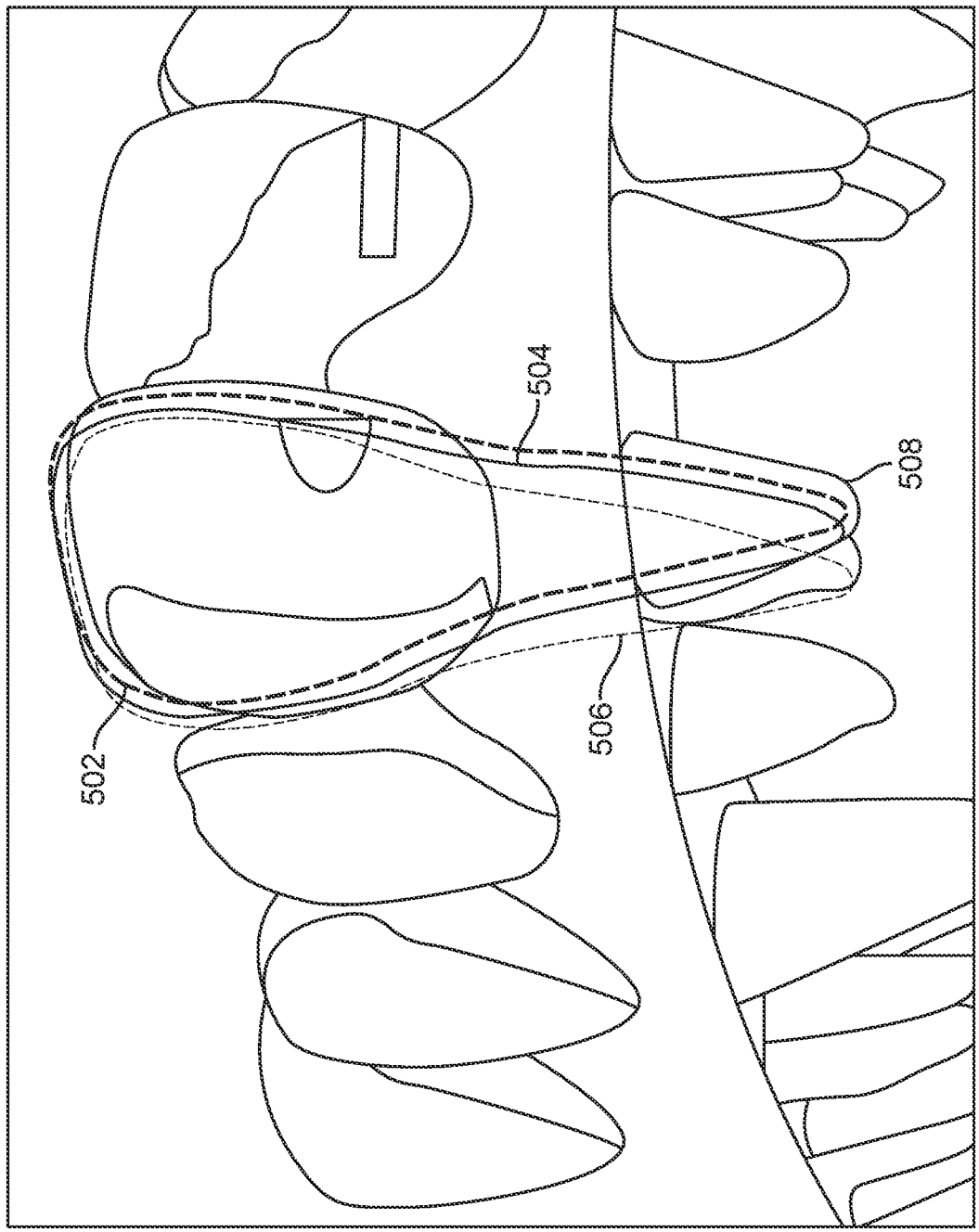
FIG. 4 shows a schematic of a tooth in a current position, a next planned position, and an overcorrected position, according to many embodiments.

FIG. 4 shows a schematic of tooth positions and is an example of a tooth in a current position 502, a planned target position 504, and an overcorrected target position 506. It can be seen that the overcorrected target position 506 can involve more movement than the planned target position 504, particularly for root part 508. The greater movement may be because the root can be normally hard to move so the aligner or polymeric shell appliance can be manufactured to move root 508 more.

Figure 5:
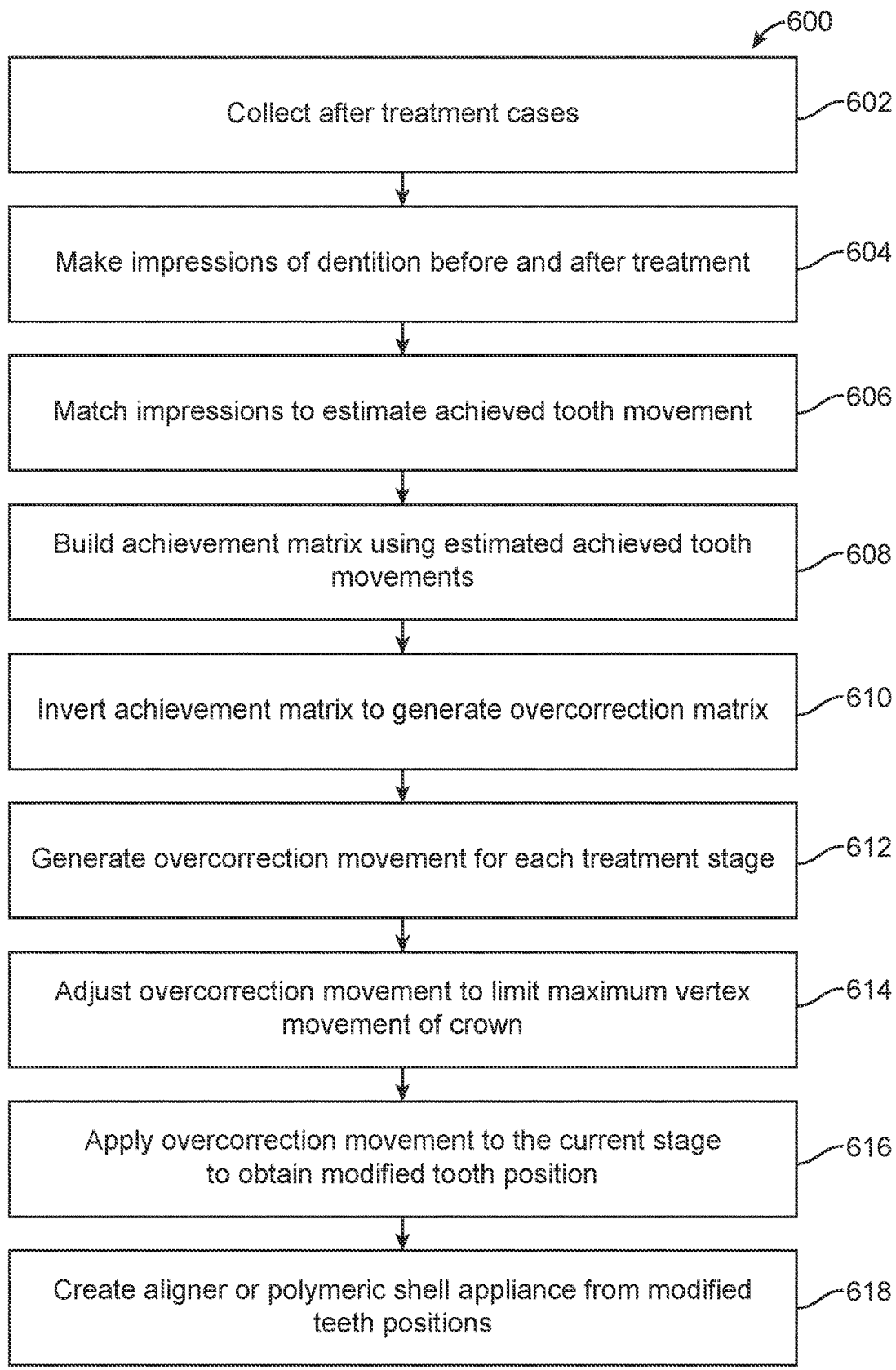
FIG. 5 shows a flowchart of a method of manufacturing a set of polymeric shell appliances with overcorrection, according to many embodiments.

FIG. 5 shows a flow chart of a method 600 of creating a polymeric shell appliance using an "achievement matrix" as described herein and above. In a step 602, after treatment cases for various patients may be collected. In a step 604, impressions of the dentition of the various patients may be made before and after the treatment to estimate the tooth movement achieved. In a step 606, the impressions may be matched to estimate the achieved tooth movement. Alternatively or in combination, other types of data besides impressions can be used, such as scans or images of the dentition before and after treatment. In a step 608, an achievement matrix may be built using the estimated achieved tooth movements of the various embodiments. The achievement matrix may be built using data analysis such as linear regression. In a step 610, the achievement matrix may be inverted to generate the overcorrection matrix. The achievement matrix can be used to correct tooth movement in response to one or more discrepancies. In a step 612, the overcorrection movement for each treatment stage may be generated by acquiring the plan movement vector for each treatment stage and multiplying by the overcorrection matrix. In a step 614, the overcorrection movement may be adjusted so the maximum vertex movement of the crown is not too small or too large (e.g., greater than 0.2 mm and less than 0.5 mm). In a step 616, the overcorrection movement may be applied to the current treatment stage to obtain the modified tooth position. In a step 618, an aligner or polymeric shell appliance may be created from the modified tooth positions of all teeth.

Although the above steps show the method 600 of generating a set of polymeric shell appliances overcorrected to move teeth in an improved manner in accordance with many embodiments, a person of ordinary skill in the art will recognize many variations based on the teaching described herein. The steps may be completed in a different order. Steps may be added or deleted. Some of the steps may comprise sub-steps. Many of the steps may be repeated as often as beneficial to the treatment.

One or more of the steps of the method 600 may be performed with circuitry as described herein, for example one or more of a processor or logic circuitry of a computer or a computerized system. The circuitry may be programmed to provide one or more of the steps of the method 600, and the program may comprise program instructions stored on a computer readable memory or programmed steps of the logic circuitry, for example.

2. Modify Tooth Position Based on Clinical and/or Mechanical Knowledge.

Another method of generating the overcorrections may be to use clinical and/or mechanical knowledge based on a history of multiple cases of treatment to move teeth with aligners or polymeric shell appliances. The clinical and/or mechanical knowledge can provide information regarding correlations between teeth movements and force systems applied by dental appliances, as well as clinical results of achieved teeth movements in response to force systems applied by dental appliances.

For example, when using aligners or polymeric shell appliances to treat a premolar extraction case, there may be an undesirable tipping effect of the canine when the space is closed. When the canine is translated distally, force can be mostly applied to the crown, which can tip the canine toward the molar. After the treatment is finished, the canine root may be straight and not aligned well with the other teeth. To better straighten and align the canine root, an attachment may be provided to the canine to add more torque and compensate for the tipping. Alternatively or in combination, the tooth position may be modified with some rotation or torque.

Figure 6:
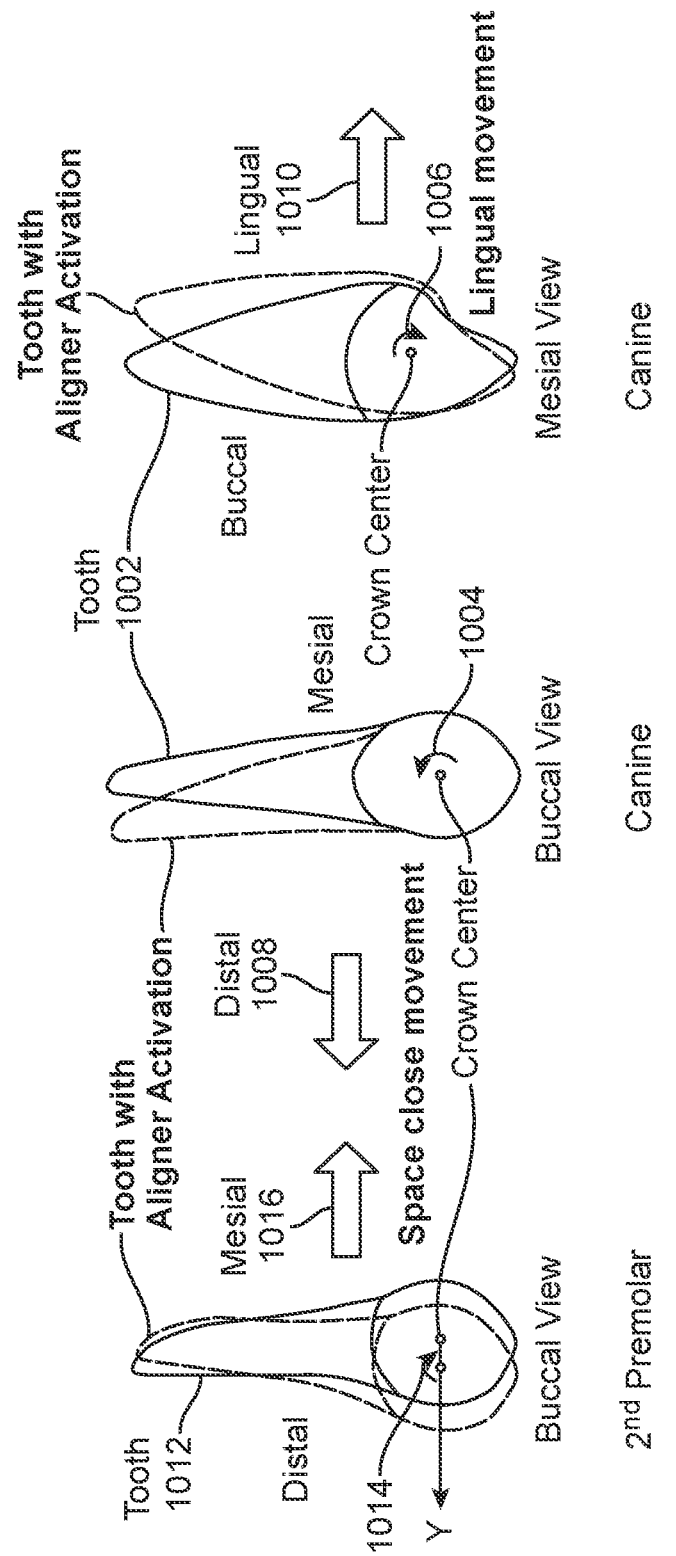
FIG. 6 shows a schematic of rotational tooth movement generated by a polymeric shell appliance, according to many embodiments.

Referring to FIG. 6, to create such a modified position, one may first determine whether premolar extraction or space closure treatment is appropriate. For canines 1002, the root apex may be rotated distally (around the X axis of the crown basis) as indicated by the arrow 1004 and lingually (around the Y axis of the crown basis) as indicated by the arrow 1006. The tipping from the distal translation as indicated by arrow 1008 and lingual movement as indicated by arrow 1010 can thereby be compensated. For the activation of a second premolar 1012, the root apex can be rotated mesially (around the X axis of the crown basis) as indicated by the arrow 1014 and the second premolar can be translated distally as indicated by the arrow 1016 in the meantime.

Figure 7:
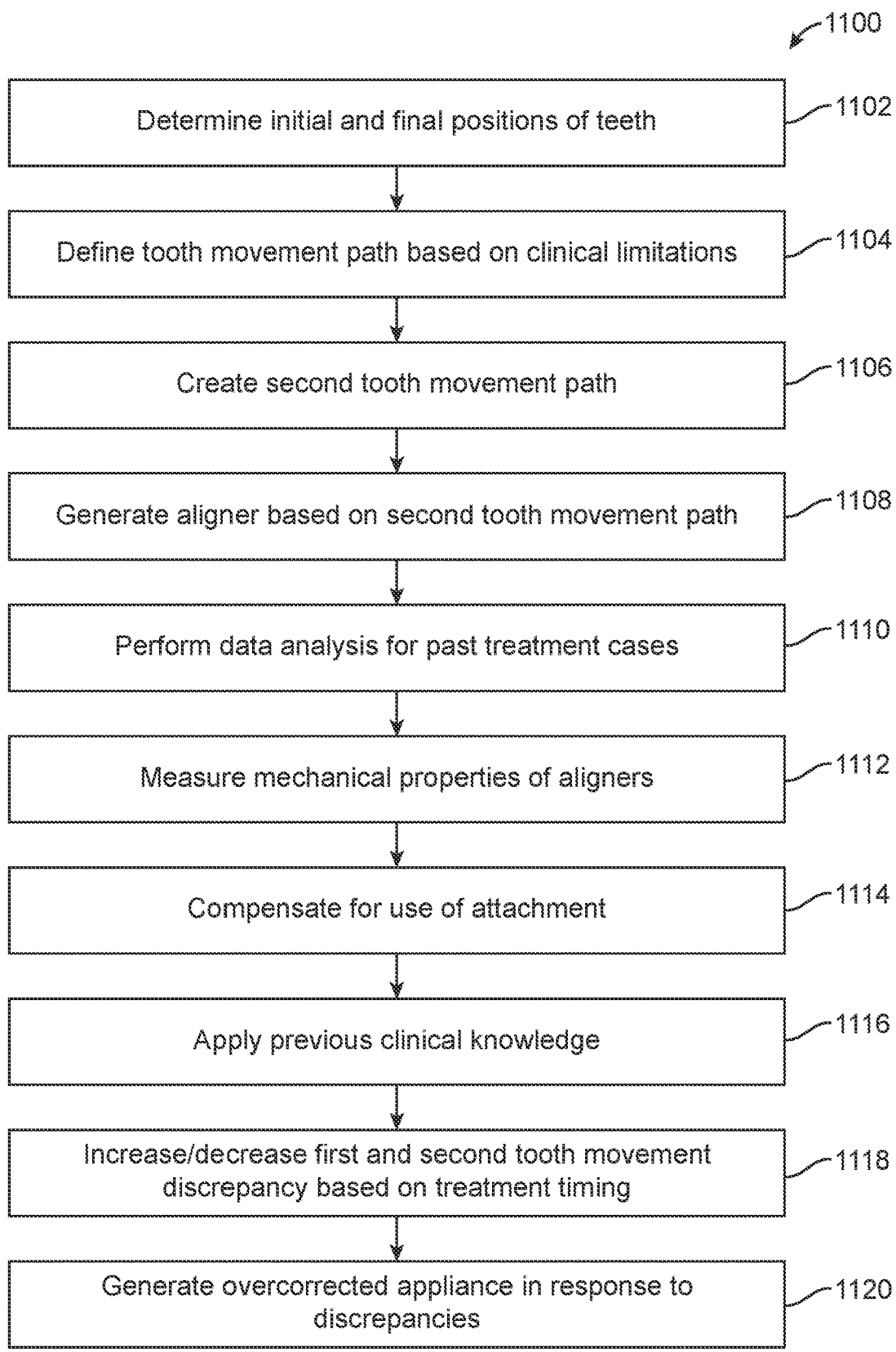
FIG. 7 shows a flowchart of a method of manufacturing a set of polymeric shell appliances with overcorrection, according to many embodiments.

Referring to FIG. 7, a method 1100 of generating an overcorrected polymeric shell appliance can be as follows. First, the initial and final positions of teeth in the course of treatment may be determined in a step 1102. Then, the tooth movement path may be defined based on clinical limitations in a step 1104, for example, to avoid the tooth collision and velocity (0.25 mm/2 weeks). From the first tooth movement path, a second tooth movement path may be created in a step 1106 and used to generate an aligner or polymeric shell appliance in a step 1108. The limitation(s) of the tooth arrangement in the second path can be bigger than that of the first path. For example, tooth collision may be allowed, and the velocity can be bigger than 0.25 mm for 2 weeks.

The knowledge to generate the second tooth movement path or arrangement can be drawn from various sources. In a step 1110, for example, data analysis may be performed for past treatment cases. In a step 1112, for example, the mechanical properties (i.e., the force/torque created) of various aligners or polymeric shell appliances may be measured in a laboratory. In a step 1114, for example, the overcorrection may account for attachments to the teeth such as a power ridge and the like. If an attachment is used, the overcorrection can be small because attachment may already help engagement and create force. In a step 1116, for example, previous clinical knowledge may be applied. In a step 1118, the overcorrection or modification from the first to second tooth paths may be larger for the initial and middle stages of the treatment, while getting smaller when the treatment is close to completed so that the final tooth arrangement is close to the final position.

In a step 1120, an overcorrected appliance is generated in response to one or more discrepancies as described above.

Although the above steps show the method 1100 of generating a set of polymeric shell appliances overcorrected to move teeth in an improved manner in accordance with many embodiments, a person of ordinary skill in the art will recognize many variations based on the teaching described herein. The steps may be completed in a different order. Steps may be added or deleted. Some of the steps may comprise sub-steps. Many of the steps may be repeated as often as beneficial to the treatment.

One or more of the steps of the method 1100 may be performed with circuitry as described herein, for example one or more of a processor or logic circuitry of a computer or a computerized system. The circuitry may be programmed to provide one or more of the steps of the method 1100, and the program may comprise program instructions stored on a computer readable memory or programmed steps of the logic circuitry, for example.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for planning an orthodontic treatment, the system comprising:
   a processor; and
   a memory operably coupled to the processor and storing instructions that, when executed by the processor, cause the system to perform operations comprising:
      receiving a digital representation of an initial position of a tooth of a patient,
      determining a target position for the tooth,
      determining an overcorrected position for the tooth that is different from the target position, wherein the overcorrected position is determined based on an overcorrection matrix generated by inverting an achievement matrix representing clinically-determined relationships between planned tooth movements and achieved tooth movements, and
      outputting fabrication instructions for an orthodontic appliance including an overcorrected tooth receiving cavity corresponding to the overcorrected position for the tooth.

2. The system of claim 1, wherein the overcorrected position is one or more of translated or rotated relative to the target position.

3. The system of claim 1, wherein the operations further comprise determining a movement vector between the initial position and the target position.

4. The system of claim 3, wherein the movement vector includes a translational component, and the operations further comprise adding a rotational component to the translational component.

5. The system of claim 4, wherein the rotational component is configured to compensate for a tipping effect.

6. The system of claim 4, wherein determining the overcorrected position comprises modifying the movement vector using the overcorrection matrix.

7. The system of claim 1, wherein the overcorrected position is determined based on a plurality of correlations between teeth movements and force systems.

8. The system of claim 1, wherein the overcorrected tooth receiving cavity is configured to apply one or more forces to the tooth to cause the tooth to move from the initial position to an actual position different from the overcorrected position.

9. The system of claim 1, wherein the operations further comprise limiting the overcorrected position based on one or more of a minimum vertex distance or a maximum vertex distance.

10. The system of claim 1, wherein the orthodontic appliance is a polymeric shell appliance including a plurality of teeth receiving cavities.

11. The system of claim 1, wherein the orthodontic appliance is one of a series of orthodontic appliances configured to reposition the patient's teeth from a first arrangement toward a second arrangement.

12. A system for planning an orthodontic treatment, the system comprising:

a processor; and a memory operably coupled to the processor and storing instructions that, when executed by the processor, cause the system to perform operations comprising:

receiving a digital representation of an initial position of a tooth of a patient, determining a target position for the tooth, generating a movement vector corresponding to movement of the tooth from the initial position to the target position, determining an overcorrected movement vector based on an overcorrection matrix generated by inverting an achievement matrix representing clinically-determined relationships between planned tooth movements and achieved tooth movements, and outputting fabrication instructions for an orthodontic appliance including an overcorrected tooth receiving cavity configured to apply a force system to the tooth corresponding to the overcorrected movement vector.

13. The system of claim 12, wherein the overcorrected movement vector is determined by multiplying the movement vector with the overcorrection matrix.

14. The system of claim 12, wherein the movement vector includes a translational component, and the overcorrected movement vector includes a combination of the translational component and a rotational component.

15. The system of claim 14, wherein the rotational component is configured to compensate for a tipping effect.

16. The system of claim 12, wherein the overcorrected movement vector is configured to move the tooth from the initial position to an overcorrected position different from the target position.

17. The system of claim 16, wherein the force system is configured to cause the tooth to move from the initial position to an actual position different from the overcorrected position.

18. The system of claim 12, wherein the operations further comprise limiting the overcorrected movement vector based on one or more of a minimum vertex distance or a maximum vertex distance.

19. The system of claim 12, wherein the orthodontic appliance is a polymeric shell appliance including a plurality of teeth receiving cavities.

20. The system of claim 12, wherein the orthodontic appliance is one of a series of orthodontic appliances configured to reposition the patient's teeth from a first arrangement toward a second arrangement.

* * * * *